United States Patent
Kocher et al.

(10) Patent No.: US 6,908,234 B2
(45) Date of Patent: Jun. 21, 2005

(54) OPTICAL CONNECTING DEVICE FOR COUPLING CONNECTORS TO AN APPARATUS WITH MULTIPLE PORTS

(75) Inventors: Mark Kocher, Stuttgart (DE); Oliver Roesch, Stuttgart (DE); Emmerich Mueller, Aidlingen (DE); Clemens Rueck, Bondorf (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/624,288

(22) Filed: Jul. 21, 2003

(65) Prior Publication Data

US 2004/0096162 A1 May 20, 2004

(30) Foreign Application Priority Data

Aug. 16, 2002 (EP) .............................. 02018410

(51) Int. Cl.[7] .............................. G02B 6/38; G02B 6/36
(52) U.S. Cl. .............................. 385/55; 385/70; 385/88
(58) Field of Search .............................. 385/55, 56, 70, 385/71, 88, 137, 58, 62

(56) References Cited

U.S. PATENT DOCUMENTS

| 4,418,983 | A |   | 12/1983 | Bowen et al. | 350/96.21 |
|---|---|---|---|---|---|
| 5,274,729 | A | * | 12/1993 | King et al. | 385/134 |
| 5,297,227 | A | * | 3/1994 | Brown et al. | 385/56 |
| 5,530,787 | A |   | 6/1996 | Arnett | 385/137 |
| 5,675,682 | A |   | 10/1997 | De Marchi | 385/77 |
| 5,937,121 | A | * | 8/1999 | Ott et al. | 385/59 |
| 5,980,312 | A | * | 11/1999 | Chapman et al. | 439/540.1 |
| 6,371,657 | B1 | * | 4/2002 | Chen et al. | 385/58 |
| 6,526,210 | B1 | * | 2/2003 | Harrison et al. | 385/134 |
| 2001/0001270 | A1 | * | 5/2001 | Vigliaturo | 385/135 |
| 2004/0013369 | A1 | * | 1/2004 | Coffey et al. | 385/53 |

FOREIGN PATENT DOCUMENTS

| EP | 0 929 199 | 7/1999 |
|---|---|---|
| EP | 1 107 031 | 6/2001 |
| JP | 58058510 | 4/1983 |

OTHER PUBLICATIONS

Elflein, W., European Search Report Application No. EP 02 01 8410 dated May 12, 2003.

* cited by examiner

Primary Examiner—Chandrika Prasad

(57) ABSTRACT

A connecting device for providing an optical connection between an apparatus comprising a apparatus port and provided for receiving and/or sending optical signals, and at least one optical fiber comprising a connector. The connecting device comprises a support plate supporting at least one adapter. The adapter comprises an adapter contact adapted for a plug connection with the apparatus port of the apparatus, and a connector contact adapted for a plug and/or screw connection with the connector of the fiber. The support plate provides a grip for manually plugging in/off all of its adapters simultaneously into/from the respective apparatus ports.

20 Claims, 5 Drawing Sheets

OPTICAL CONNECTING DEVICE FOR COUPLING CONNECTORS TO AN APPARATUS WITH MULTIPLE PORTS

BACKGROUND OF THE INVENTION

This invention refers to a connecting device for providing an optical connection.

In the measurement technology, a measuring apparatus usually has to be connected with a fiber to perform measurements, e.g. test and calibration measurements. Therefore, the apparatus comprises for each fiber a separate apparatus port each adapted for a plug and/or screw connection with a connector provided at the end of the respective fiber.

SUMMARY OF THE INVENTION

It is an object of the present invention to provide an improved connecting. The object is solved by the independent claims. Preferred embodiments are shown by the dependent claims.

Providing a connecting device comprising two or more adapters simplifies the performing of a plurality of connections. For an easy handling of the connectors the operator needs enough space between adjacent apparatus ports, but at the housing of the apparatus the available space for arranging the apparatus ports is limited. The higher the density of the apparatus port arrangement the bigger the difficulty of handling the connectors and performing the respective connecting movement, which in particular is a plug and screw movement. Since the connecting device according to the invention simplifies the handling of a plurality of connectors the user or operator need less time for the preparation of a measurement with a lot of fibers to be connected with the apparatus.

A preferred embodiment having plug contacts allows that only a pure plugging movement, without any screw movement is necessary to establish the connection between at least two connectors and at least two apparatus ports. Therefore, it is possible to connect all connectors independently from the apparatus ports and independently from the apparatus to the respective adapters of one or more support plates. After plugging and/or screwing the connectors into the connector contacts the adapters can be simply plugged with its adapter contacts into the apparatus ports of the apparatus. Since a pure plugging movement for connecting or disconnecting adapters and apparatus ports needs less space between adjacent apparatus ports the invention simplifies the plugging in and/or plugging off of the connectors and/or allows a higher density of apparatus ports at the apparatus.

In another embodiment the support plate provides a grip for substantially concurrently contacting all of its adapters with the respective apparatus ports to be contacted. Said grip simplifies the handling of the connecting device, in particular if the connecting device comprises a plurality of adapters.

According to a preferred embodiment the support plate supports two or more adapters, wherein all adapters of the support plate are arranged in a straight line. With help of this feature it is possible to arrange the adapters and therefore the apparatus ports with a close proximity leading to a high port density. All the more since the arrangement of the apparatus ports at the apparatus may be provided for coupling two or more connecting devices.

In another embodiment the connecting device comprises at least one locking device providing a fixed position between each pair of adapter and apparatus port plugged together. This feature ensures a secure and stable connection between the connectors and the apparatus ports.

In a further embodiment one ore more adapters of the supporting plate are provided with such a locking device, and the support plate is provided for simultaneously adjusting the locking devices of all of its adapters between a locking state and a releasing state. Therefore, the securing and releasing of the adapters connected to the respective apparatus ports is easy to handle by the user or operator.

BRIEF DESCRIPTION OF THE DRAWINGS

Other objects and many of the attendant advantages of the present invention will be readily appreciated and become better understood by reference to the following detailed description when considered in connection with the accompanying drawings. Features that are substantially or functionally equal or similar will be referred to with the same reference sign(s).

DETAILED DESCRIPTION OF THE INVENTION

Figure 1:
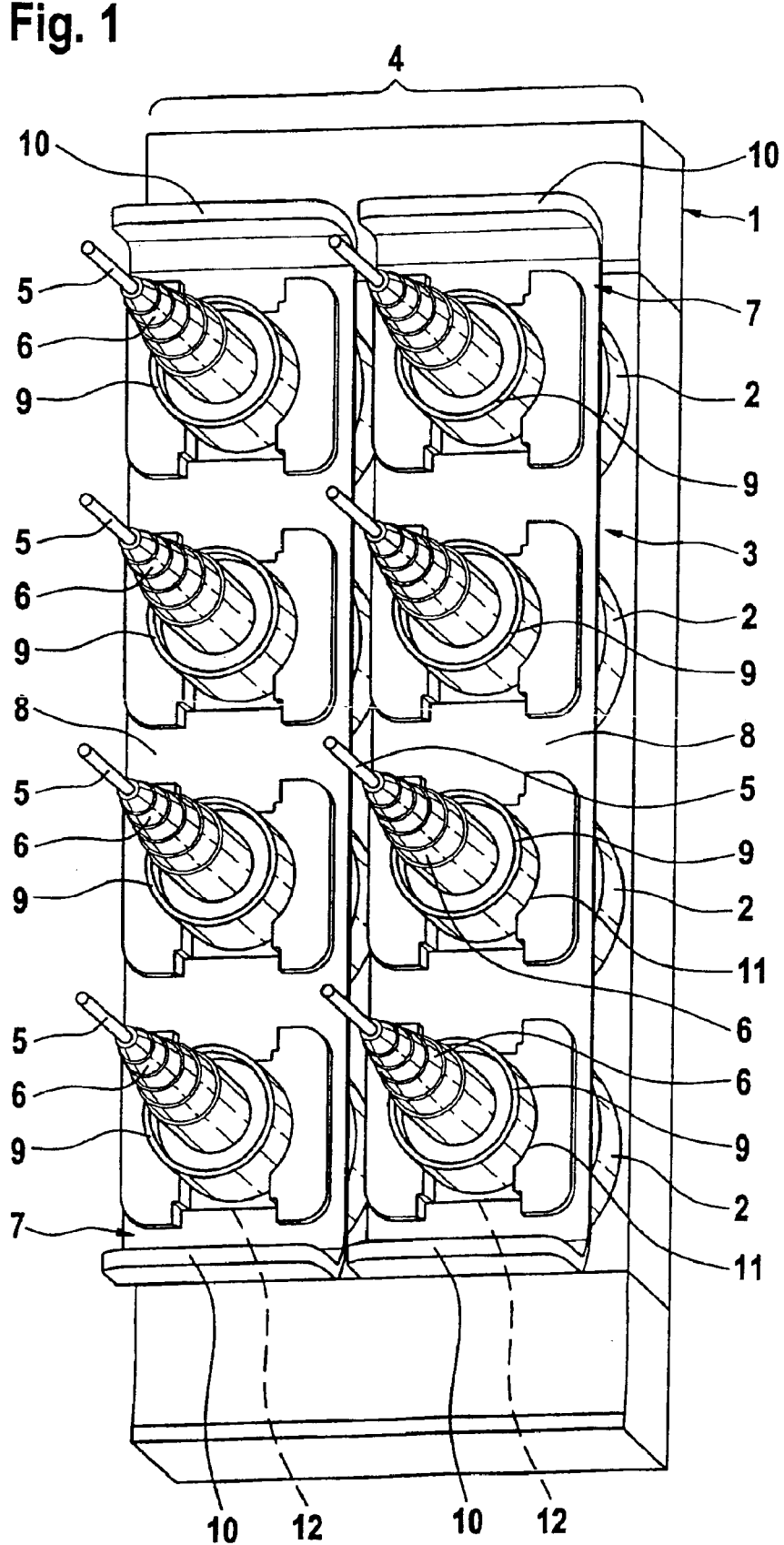
FIG. 1 depicts an isometric view of a connecting device according to the invention.
Figure 2:
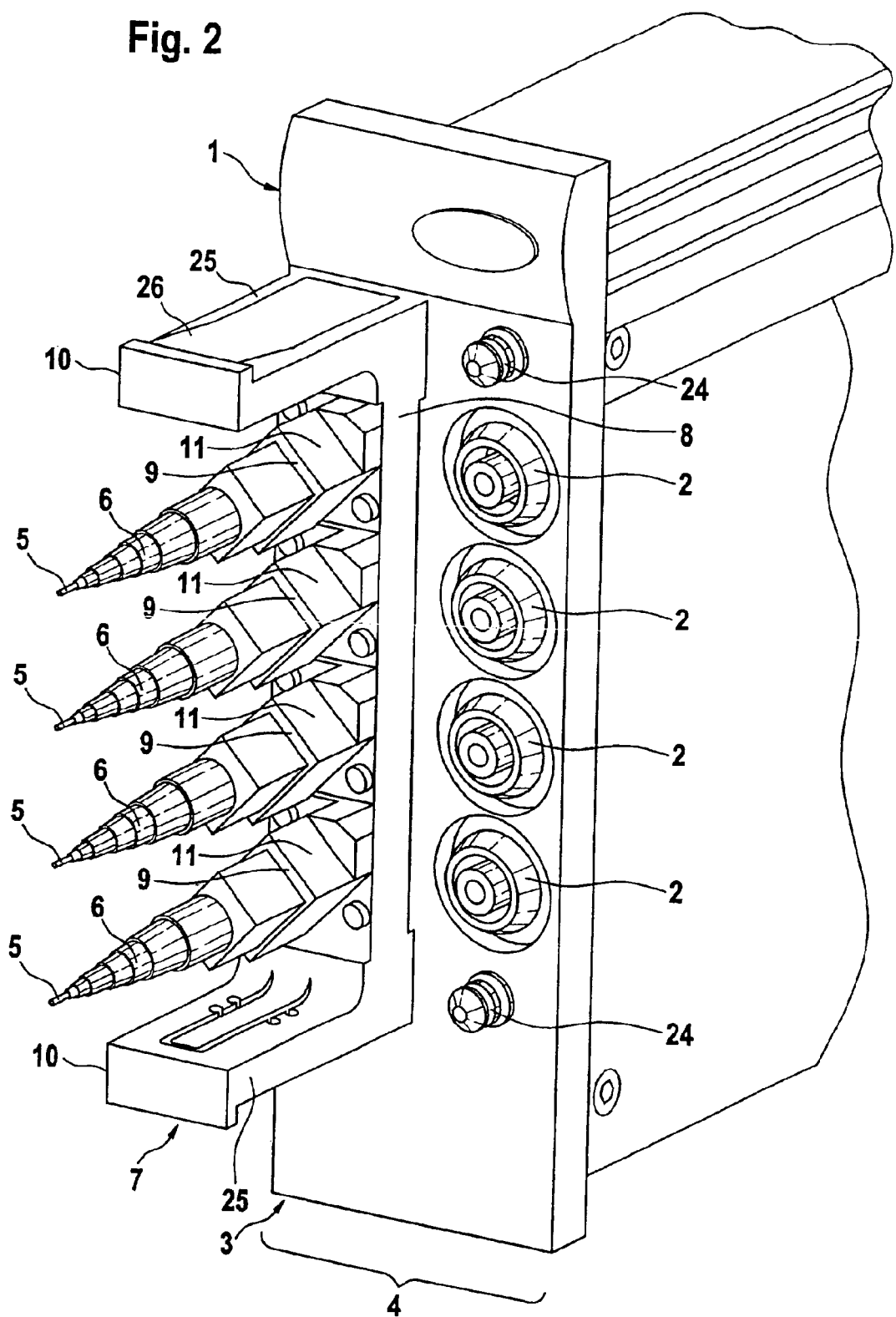
FIG. 2 depicts an isometric view of another connecting device.

According to FIGS. 1 and 2 an apparatus 1 is provided with a plurality optical apparatus ports 2. In FIGS. 1 and 2 the apparatus 1 is represented by a portion 4 of its housing 3. This housing-portion 4 shows a multi-arrangement with eight apparatus ports 2. The apparatus 1 is provided for receiving and/or sending optical signals via its apparatus ports 2. Additionally, the apparatus 1 also may be provided for processing optical and/or electronic signals, in particular the apparatus 1 is provided as a measurement-instrument 1, e.g. to perform test and/or calibration measurements.

For signal input and/or output it is necessary to couple the apparatus 1 with several optical fibers 5. To this aim each fiber 5 is at its end provided with an optical connector 6, which has to be coupled with the respective apparatus port 2.

A preferred embodiment of such a connector 6 is provided for a plug and screw connection, i.e. a combined screw and plug movement has to be performed for plugging the connector 6 into a complementary contact it in this contact. According to FIGS. 1 and 2 the apparatus ports 2 are arranged with a high density at the housing 3. If these contacts would be adapted for a plug and screw connection it would be very difficult for the operator to couple all connectors 6 with the respective contacts due to ergonomic reasons.

To simplify the plugging in and/or plugging off the apparatus 1 according to the present invention comprises at least one connecting device 7 with a support plate 8. Each support plate 8 supports at least one adapter 9. The number of connecting devices 7 per apparatus 1 and the number of adapters 9 per support plate 8 depend on the respective apparatus port arrangement at the housing 3 of the respective apparatus 1. Therefore the apparatus 1 of FIGS. 1 and 2 each comprises at least two connecting devices 7, wherein each supporting plate 8 of these connecting devices 7 comprises four adapters 9. In FIG. 2 only one connecting device 7 is depicted.

Figure 4:
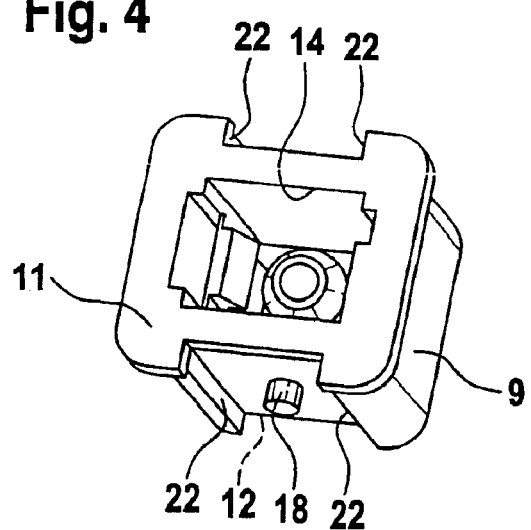
FIG. 4 depicts an isometric view of an adapter holder.

Each adapter 9 comprises a connector contact 11 turned towards the viewer, formed complementary to the respective connector 6 and provided for a plug and/or screw connection between the connector contact 11 of the adapter 9 and one of the connectors 6. Since the respective connectors 6 are provided for a plug and screw connection, the complementary connector contacts 11 are adapted for a plug and screw connection, too. Turned away from the viewer each adapter 9 comprises an adapter contact 12 (see FIG. 4) provided for a plug connection between the adapter contact 12 of the adapter 9 and one of the apparatus ports 2. The adapter contacts 12 are complementary formed to the respective apparatus ports 2 and are also provided for a plug connection. Therefore it is very easy for the operator to perform a connection between the apparatus ports 2 and the adapter contacts 12 by a simple plugging movement.

Each supporting plate 8 comprises at its opposing ends two end portions 10 formed by bending the support plate 8 at its ends. These end portions 10 provide a grip for manually handling the connecting device 7 by the user or operator.

Referring to FIGS. 1 and 2 all adapters 9 supported by the same support plate 8 are arranged in a straight line, wherein adjacent adapters 9 are in a close proximity to each other. Therefore the adapter arrangement does not need much space. According to this, the apparatus ports 2 assigned to the same connecting device 7 are also arranged in a straight line and adjacent apparatus ports 2 only have small distances between each other. Therefore, it is possible to perform a apparatus port-arrangement at the housing 3 with a high density of apparatus ports 2. In a suitable embodiment the end portions 10 of the support plate 8 are arranged in the same straight line as the adapters 9 supported by this support plate 8.

The connecting device 7 according to the invention works as follows:

For coupling the apparatus 1 with a big number of fibers 5, e.g. forty fibers 5, the fibers 5 are divided up into several groups each comprising a small number of fibers 5 according to the number of adapters 9 per connecting device 7. Therefore, in the example of FIG. 1 each group of fibers 5 comprises four fibers 5 and four connectors 6. The connectors 6 of each group of four fibers 5 are then plugged and/or screwed into the connector contacts 11 of the respective adapters 9. Since at this state the connection device 7 is separated from the housing 3 of the apparatus 1 the operator has enough space for manipulating the connectors 6.

After coupling all connectors 6 assigned to the respective connecting device 7 the operator uses the grip provided by the end portions 10 for plugging in simultaneously all adapter contacts 12 of the adapters 9 into the apparatus ports 2 assigned to this group of fibers 5. The arrangement of the apparatus ports 2 at the housing 3 provides enough space for this plugging or coupling work. It should be clear, that the de-coupling of the fibers 5 from the apparatus 1 works vice versa.

In a preferred embodiment all connecting devices 7 and/or all support plates 8 and/or all fibers 5 and/or all connectors 6 and/or all adapters 9 and/or all apparatus ports 2 are of the same type. It is clear, that another embodiment may comprise two or more types of connecting devices 7 and/or of support plates 8 and/or of fibers 5 and/or of connectors 6 and/or of adapters 9 and/or of apparatus ports 2. E.g. the different types of fibers 5 may be different with respect to the number of modes (single-mode fiber and multi-mode fiber). Different types of support plates 8 may be provided for different numbers of adapters 9 and/or may have different end portions 10. The adapter-types may be adapted for different apparatus ports 2 and/or for different connectors 6.

All types of support plates 8 and adapters 9 constitute a system for mounting connecting devices 7 of different types. With help of such a system it is very simple to generate connecting devices 7 individually adapted to the respective apparatus 1 or to its apparatus port arrangement, respectively. Since the connecting devices 7 are individually provided for the use with the respective apparatus 1, this apparatus 1 and all connecting devices 7 assigned thereto constitute another system, in particular a signal processing system.

Figure 3:
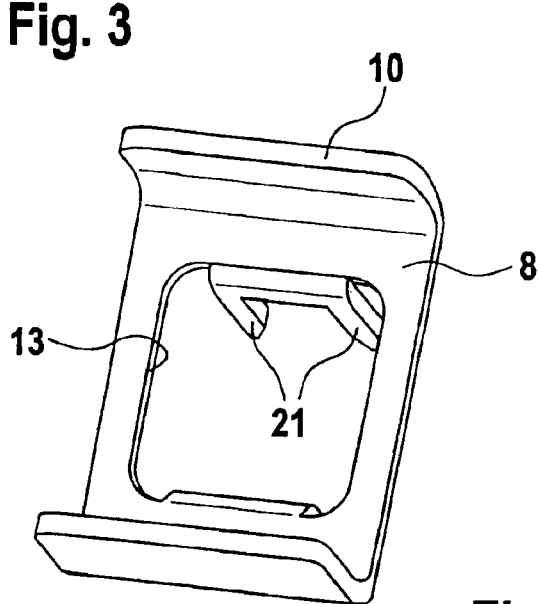
FIG. 3 depicts an isometric view of a support plate.

FIG. 3 depicts an end portion of the support plate 8 according to the example of FIG. 1. For each adapter 9 the support plate 8 comprises a first receiving opening 13 provided for inserting the adapter 9. According to FIG. 4 the outer shape of the respective adapter 9 is formed complementary to the inner shape of the first receiving opening 13. The connector contact 11 of the adapter 9 comprises a second receiving opening 14 provided for a plug in and/or screw connection with the complementary type of connector 6.

Figure 5:
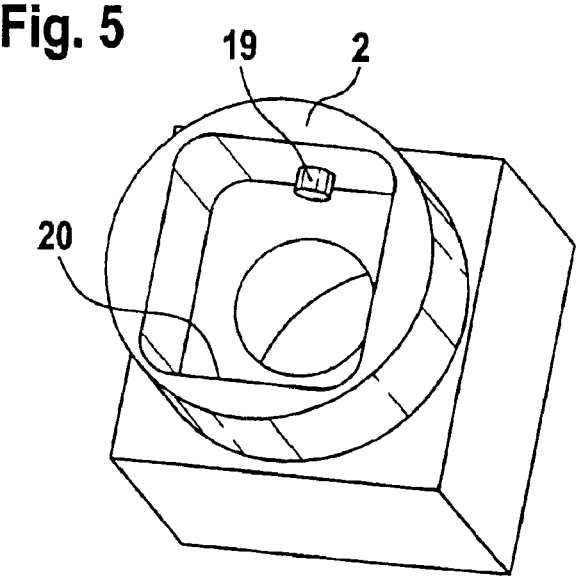
FIG. 5 depicts an isometric view of a apparatus port.

In FIG. 5 the apparatus port 2 is depicted independently or separately from the respective housing 3 of the apparatus 1. The front side of the apparatus port 2 turned towards the viewer comprises a third receiving opening 20 provided for a plugging connection with the adapter contact 12 of the adapter 9.

Figure 6:
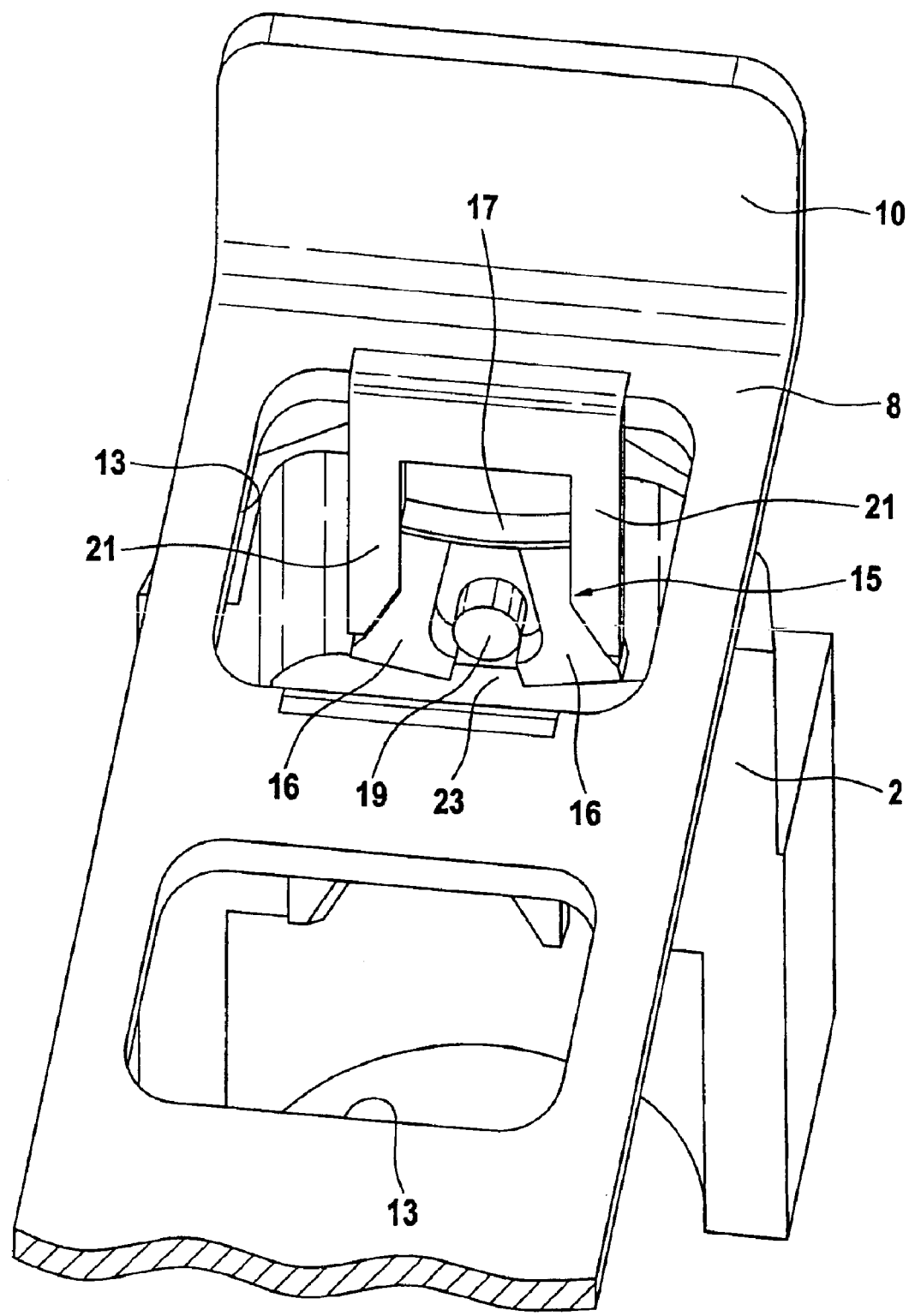
FIGS. 6 and 7 depict isometric views of a connecting device at different states.
Figure 7:
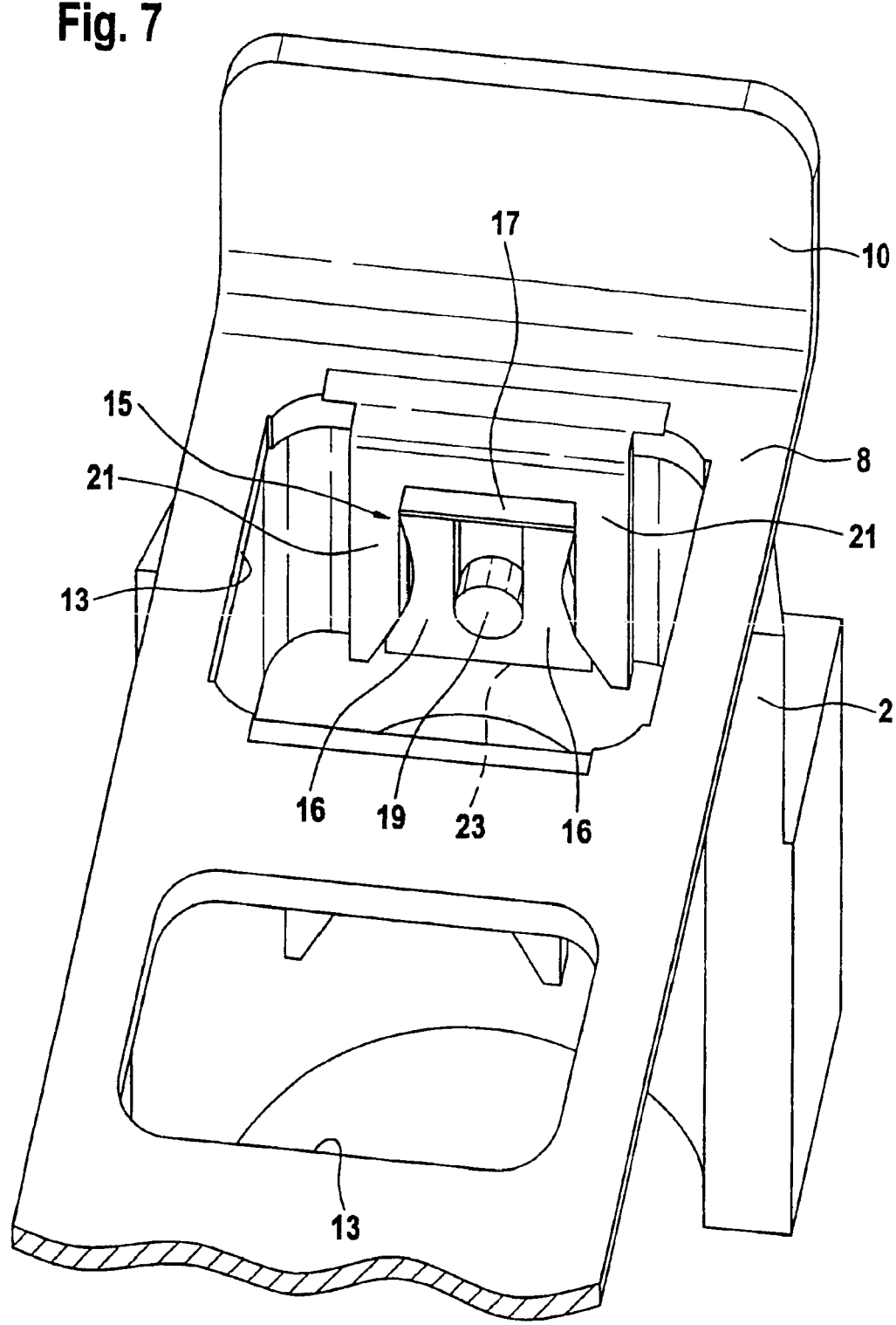

According to FIGS. 6 and 7 the connecting device 7 is provided with at least one locking device 15. In the embodiment of FIGS. 6 and 7 the locking device 15 is provided at one of the adapters 9, which is—for a better understanding—not shown in the FIGS. 6 and 7. Such a locking device 15 comprises a pair of catching members 16 movably, in particular swingably, mounted at the respective adapter 9. To this aim each catching member 16 is fastened to a plate spring 17, which is secured to the respective adapter 9 not shown. E.g. this plate spring 17 is fixed at a plug 18 projecting at the outside of the adapter 9 (see FIG. 4). This plug 18 may be provided with a slot, in which the plate spring 17 is inserted. The locking device 15 also comprises a pin 19 projecting at the inside of the third receiving opening 20 (see FIGS. 5 to 7).

For actuating the catching members 16 the locking device 15 comprises for each catching member 16 an actuating member 21 co-operating with the assigned catching member 16. In the shown preferred embodiments each actuating member 21 is a part of the support plate 8 formed by bending a suitably shaped portion of the support plate 8. The actuating members 21 are arranged at the edge of the first receiving opening 13 and are shaped as fingers projecting in the direction of the plugging movement between the adapter contact 12 of the adapter 9 and the respective apparatus port 2. At its outside the adapter 9 comprises two opposing guiding edges 22 extending parallel to the plugging direction (see FIG. 4). If the adapter 9 is inserted into the first receiving opening 13 the fingers or the actuating members 21 respectively co-operate with the guiding edges 22 and constitute a sliding fit between the adapter 9 and the support plate 8. Therefore the adapter 9 is relative to the support plate 8 and parallel to the plugging direction movably mounted at the support plate 8.

The FIGS. 6 and 7 show supporting plates 8 comprising at least two first receiving openings 13. In this embodiment only one of the first receiving openings 13 is provided with the actuating members 21. In another embodiment not shown two or more, in particular all, fist receiving openings 13 are provided with the actuating members 21. In a preferred embodiment the locking device 15 comprises two pairs of catching members 16 per adapter 9. Said pairs of catching members 16 are arranged at the outside of the adapter 9 at opposing sides. Consequently, the corresponding first receiving opening 13 also comprises two pairs of actuating members 21 arranged at opposing edge portions.

The locking device 15 works as follows:

The catching members 16 are movably mounted to the adapter 9 and therefore adjustable between a release position shown in FIG. 6 and a locking position shown in FIG. 7. In the locking position of FIG. 7 the catching members 16 embrace the pin 19 at both sides providing a fixed position between the respective pair of adapter 9 and apparatus port 2 plugged together. Such a fixed coupling is necessary for a signal and/or data transmission with high performance. In the release position of FIG. 6 the catching members 16 release the respective pin 19 enabling a movement between the adapter 9 and the apparatus port 2 in the plugging direction.

Since the connecting device 7 is plugged off from the respective apparatus ports 2 the actuating members 21 have the position according to FIG. 6 enabling the catching members 16 to swivel into their release position in which their free ends are spaced apart from each other and form a gap 23 between each other.

While the adapters 9 get plugged into the corresponding apparatus ports 2 the pin 19 penetrates through this gap 23 into the space between the two catching members 16. As soon as the adapters 9 are completely plugged in into the respective apparatus ports 2, the adapters 9 abut against the apparatus ports 2 and the actuating members 21 start moving in the plugging direction, if the operator still forces the support plate 8 in the plugging direction. Since the actuating members 21 get pushed in the plugging direction they consequently co-operate with the catching members 16 and urge them for a swivel movement, wherein their free ends move towards each other and close the gab 23. At the end of this plug in movement the catching members 16 have reached their locking position embracing the pin 19. Additionally the pushed in actuating members 21 ensure this locking position, as long as the support plate 8 remains in this push-position shown in FIG. 7.

For plugging off the adapters 9 from the respective apparatus ports 2 the operator pulls at the support plate 8 of the connecting device 7. According to this plug off movement the actuating members 21 get pulled out and release the catching members 16. The spring tension of the plate spring 17 urges the catching members 16 into their release position. Therefore the catching members 16 automatically move into their release position as soon as the support plate 8 reaches the pull-position shown in FIG. 6. In this pull-position a distance between the bottom side of the support plate 8 and the top side of the adapters 9 is bigger as in the push-position according to FIG. 7. Since the catching members 16 have reached their releasing position the operator can pull off the connecting device 7 from the apparatus 1.

In the embodiment of FIG. 2 the locking device 15 comprises two buttons 24 for each connecting device 7, and two gripper members 25 integrated into the end portions 10 or handling grips 10 of the support plate 8. These gripper members 25 may be adapted for providing a passive fixation between support plate 8 and housing 3 by plugging the gripper members 25 onto the buttons 24. This fixation can be performed automatically by plugging the adapters 9 with the support plate 8 onto the apparatus ports 2. For releasing the fixation with the buttons 24 the gripper member 25 comprises a release lever 26, which can be manually activated by the operator.

In another embodiment not shown the support plate 8 also may be provided with a receptacle adapted for mounting a cable channel to the support plate 8. Such a cable channel receives, protects and guides the fibers 5 of the respective connecting device 7. Additionally, such a cable channel provides an organized arrangement of the plurality of fibers 5.

In a further embodiment at least one of the adapters 9 may be adapted for receiving at least one bare fiber 5. Thus, the respective fiber 5 doesn't need to be coupled to the connector 6. The bare fiber 5 can be coupled directly to the adapter 9, and via the adapter 9 to the apparatus 1.

A remarkable advantage of the connecting device 7 according to the invention is the fact, that all connectors 6 coupled with the adapters 9 of the connecting device 7 can simultaneously be plugged in into the respective apparatus ports 2 or plugged off from the respective apparatus ports 2, respectively. Another important advantage is, that the adapter arrangement at the support plate 8 of the connecting device 7 and the apparatus port arrangement at the housing 3 of the apparatus 1 can be performed with a maximum density. The latter advantage is the consequent result of the adapter principle of the connecting device 7. This feature allows the mounting of the connectors 6 to the adapters 9 independently from the apparatus ports 2. Therefore the operator has no problems with the small distances between adjacent apparatus ports 2 at the housing 3. In addition to that the connection of the fibers to the measurement instrument 1 could be done a factor faster using the connecting devices 7 according to the invention. The factor is determined by the number of adapters per connecting device 7.

What is claimed is:

1. A connecting device for providing an optical connection between an apparatus having a plurality of ports for receiving and/or sending optical signals, and a connector, the connecting device comprising:

a support plate supporting a plurality of adapters, wherein each of said plurality of adapters includes an adapter contact for providing a connection with one of said plurality of ports, and a connector contact for providing a connection with said connector; and a locking device for maintaining a fixed position between said plurality of adapters and said plurality of ports, wherein said support plate includes a member that interfaces with said locking device to activate said locking device.

2. The connecting device according to claim 1, wherein said support plate provides a grip for substantially concurrently contacting all of said plurality of adapters with respective ports of said plurality of ports to be contacted.

3. The connecting device according to claim 1, wherein said adapter contacts and said plurality of ports provide a plug connection.

4. The connecting device according to claim 1, wherein said connector contacts and said connectors provide a connection selected from the group consisting of: a plug connection, a screw connection, and a combination thereof.

5. The connecting device according to claim 1, wherein:
said support plate supports said plurality of adapters, and
all of said plurality of adapters of said support plate are arranged in a straight line.

6. The connecting device according to claim 1, further comprising a grip provided by two opposing end portions of said support plate.

7. The connecting device according to claim 6, wherein said end portions and said at least two adapters are arranged in a straight line.

8. The connecting device according to claim 1, wherein:
said adapter contacts of said plurality of adapters are adapted for a port type selected from the group consisting of: the same port type, different port types, and a combination thereof, and
said connector contacts of said plurality of adapters are adapted for a connector type selected from the group consisting of: the same connector type, different connector types, and a combination thereof.

9. The connecting device according to claim 1, wherein at least one adapter of said plurality of adapters is adapted for a connector and port selected from the group consisting of: a single-mode connector and port, a multi-mode connector and port, and a combination thereof.

10. The connecting device according to claim 1, wherein:
at least one of said plurality of adapters is provided with said locking device, and
said support plate simultaneously activates each said locking devices.

11. The connecting device according to claim 1, wherein:
said locking device includes at least one catching member mounted on one of said plurality of adapters and movable between a locking position and a release position,
said catching member embraces a pin of said port when in said locking position, and
said catching member releases said pin when in said release position.

12. The connecting device according to claim 11, wherein said locking device is activated by said member of said support plate to move said catching member from said release position to said locking position, and wherein said locking device is de-activated by said member of said support plate to move said catching member from said locking position to said release position.

13. The connecting device according to claim 1, wherein at least one of said plurality of adapters receives at least one bare fiber.

14. The connecting device according to claim 1, wherein said connector is coupled to an optical fiber, and wherein said support plate includes a receptacle for mounting a cable channel that receives, protects and guides said optical fiber of said connecting device.

15. The connecting device according to claim 1, wherein:
each adapter of said plurality of adapters is movably mounted on said support plate relative to said support plate and parallel to a plugging direction,
said member is at least one actuating member co-operating with at least one catching member of said adapter,
a plug in movement of said support plate pushes said at least one actuating member to urge said respective at least one catching member into a locking position, and
a plug off movement of said support plate pulls said at least one actuating member to release said at least one respective catching member into a release position.

16. The connecting device according to claim 11, wherein said locking device is passively activated to said locking position by plugging-in said connecting device, and wherein said locking device is passively de-activated to said release position by pulling said connecting device.

17. The connecting device according to claim 1, wherein said member also interfaces with said locking device to de-activate said locking device.

18. A system comprising:
at least one apparatus having a plurality of ports for receiving and/or sending optical signals;
a plurality of connectors;
at least one connecting device providing optical connections between at least two of said plurality of ports and at least two of said plurality of connectors, wherein said connecting device includes a support plate supporting a plurality of adapters, and wherein each of said plurality of adapters includes an adapter contact for providing a connection with one of said plurality of ports, and a connector contact for providing a connection with one of said plurality of connectors; and
a locking device for maintaining a fixed position between said plurality of adapters and said plurality of ports, wherein said support plate includes a member that interfaces with said locking device to activate said locking device.

19. The system according to claim 18, wherein all of said plurality of ports assigned to the same connecting device are arranged in a straight line.

20. A system for mounting a connecting device, wherein said connecting device provides an optical connection between an apparatus having a plurality of ports for receiving and/or sending optical signals, and a connector, said connecting device includes a support plate supporting a plurality of adapters, wherein each adapter includes an adapter contact for providing a connection with one of said plurality of ports and a connector contact for providing a connection with said connector, wherein said connecting device includes a locking device for maintaining a fixed position between said plurality of adapters and said plurality of ports, and wherein said support plate includes a member that interfaces with said locking device to activate said locking device, said system comprising components selected from the group consisting of:
at least two types of support plates selected from the group consisting of: support plates adapted for different types of adapters, support plates adapted for different numbers of adapters, and a combination thereof,
at least two types of adapters selected from the group consisting of: adapters adapted for different connectors, adapters adapted for different ports, and a combination thereof, and
a combination thereof.

* * * * *